United States Patent
Suzuki et al.

(10) Patent No.: US 10,235,658 B2
(45) Date of Patent: Mar. 19, 2019

(54) MAINTENANCE MANAGEMENT DEVICE FOR OPERATING MACHINERY

(71) Applicant: HITACHI CONSTRUCTION MACHINERY CO., LTD., Bunkyo-ku, Tokyo (JP)

(72) Inventors: Hideaki Suzuki, Tokyo (JP); Kozo Nakamura, Tokyo (JP); Shinya Yuda, Tokyo (JP); Munetoshi Unuma, Tokyo (JP); Junsuke Fujiwara, Tokyo (JP); Takayuki Uchida, Tokyo (JP); Katsuaki Tanaka, Tokyo (JP); Mitsuo Aihara, Tsuchiura (JP); Teruo Nakamura, Tsuchiura (JP); Nobuyoshi Hirowatari, Tsuchiura (JP); Hiroshi Ogura, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 1102 days.

(21) Appl. No.: 14/414,282

(22) PCT Filed: Jul. 10, 2013

(86) PCT No.: PCT/JP2013/068888
§ 371 (c)(1),
(2) Date: Jan. 12, 2015

(87) PCT Pub. No.: WO2014/010632
PCT Pub. Date: Jan. 16, 2014

(65) Prior Publication Data
US 2015/0206104 A1    Jul. 23, 2015

(30) Foreign Application Priority Data

Jul. 13, 2012 (JP) ................. 2012-158052

(51) Int. Cl.
*G06Q 10/00* (2012.01)
*G06Q 30/02* (2012.01)
(Continued)

(52) U.S. Cl.
CPC .......... *G06Q 10/20* (2013.01); *E02F 9/2054* (2013.01); *E02F 9/267* (2013.01);
(Continued)

(58) Field of Classification Search
CPC .... G06Q 10/20; G06Q 30/0283; G06Q 50/10; G05B 23/0283; G07C 5/008; G07C 5/0816; E02F 9/2054; E02F 9/267
See application file for complete search history.

(56) References Cited

U.S. PATENT DOCUMENTS

| | | | | |
|---|---|---|---|---|
| 6,832,205 B1 * | 12/2004 | Aragones | ............... | G06Q 10/06 703/6 |
| 2001/0029461 A1 * | 10/2001 | Kobayashi | ............. | G06Q 10/06 705/7.12 |

(Continued)

FOREIGN PATENT DOCUMENTS

| JP | 9-54613 A | 2/1997 |
|---|---|---|
| JP | 2002-73155 | 3/2002 |

(Continued)

OTHER PUBLICATIONS

International Preliminary Report on Patentability for International Application No. PCT/JP2013/068888 dated Jan. 22, 2015.

*Primary Examiner* — Manuel L Barbee
(74) *Attorney, Agent, or Firm* — Mattingly & Malur, PC

(57) ABSTRACT

The maintenance management device 3 includes an error status diagnosis unit 11, a grace period estimation unit 14, a maintenance cost estimation unit 15, and a screen display unit 17. When the error status diagnosis unit 11 has diagnosed the occurrence of an anomaly, the grace period (Continued)

estimation unit 14 estimates a first grace period leading up to the occurrence of a failure. The maintenance cost estimation unit 15 estimates the cost of corrective maintenance incurred when the failure occurs after the elapse of the first grace period. The screen display unit 17 displays a combination of the first grace period and the cost of corrective maintenance. Alternatively, the grace period estimation unit 14 estimates a second grace period over which preventive maintenance may be postponed without a failure.

6 Claims, 10 Drawing Sheets

(51) Int. Cl.
| | |
|---|---|
| *G07C 5/00* | (2006.01) |
| *G06Q 50/10* | (2012.01) |
| *G05B 23/02* | (2006.01) |
| *E02F 9/20* | (2006.01) |
| *E02F 9/26* | (2006.01) |
| *G07C 5/08* | (2006.01) |

(52) U.S. Cl.
CPC ..... *G05B 23/0283* (2013.01); *G06Q 30/0283* (2013.01); *G06Q 50/10* (2013.01); *G07C 5/008* (2013.01); *G07C 5/0816* (2013.01)

(56) References Cited

U.S. PATENT DOCUMENTS

2003/0005486 A1\* 1/2003 Ridolfo ............. G05B 23/0272
  800/288
2013/0218522 A1 8/2013 Suzuki et al.

FOREIGN PATENT DOCUMENTS

| | | |
|---|---|---|
| JP | 2002-195056 A | 7/2002 |
| JP | 2004-145496 A | 5/2004 |
| JP | 2007-257376 | 4/2007 |
| JP | 2012-94044 A | 5/2012 |
| WO | 2009/020229 A1 | 2/2009 |

\* cited by examiner

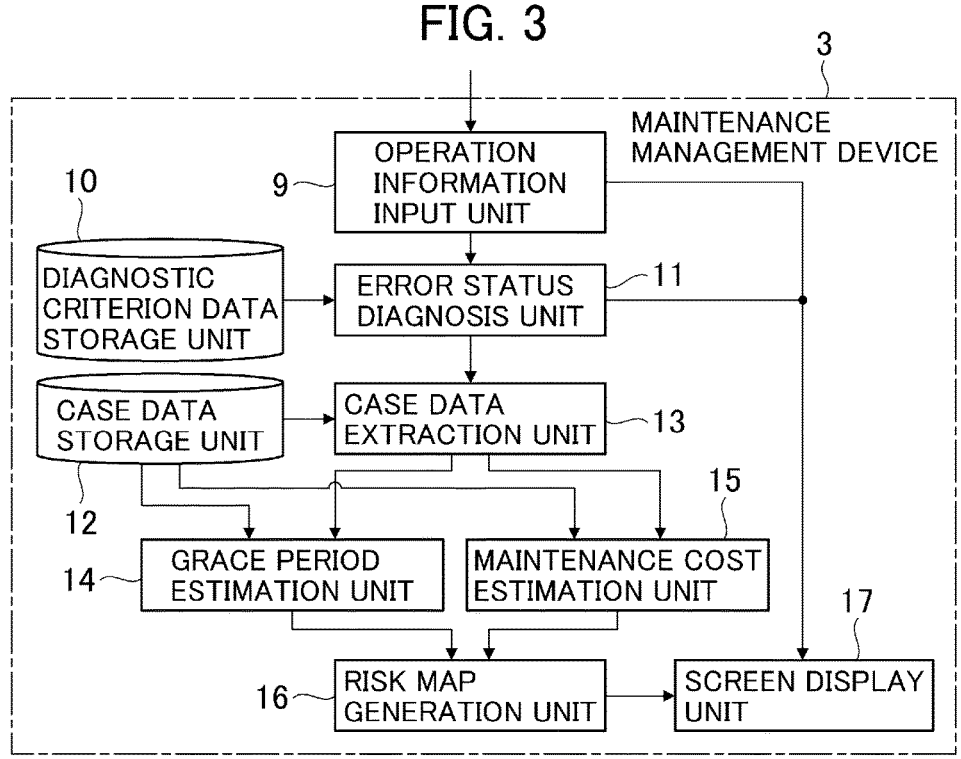

| CASE NO. | ANOMALY TYPE | MAINTENANCE TYPE | TIME FOR IMPLEMENTATION OF PREVENTIVE MAINTENANCE | FAILURE OCCURRENCE TIME | MAINTENANCE WORK NO. |
|---|---|---|---|---|---|
| N1 | S1 | CORRECTIVE | – | $tz1$ | M1 |
| N2 | S1 | PREVENTIVE | $ty1$ | – | M2 |
| ⋮ | ⋮ | ⋮ | ⋮ | ⋮ | ⋮ |

| TIME | SENSOR A | SENSOR B | SENSOR C |
|---|---|---|---|
| $tx0$ | $Vax0$ | $Vbx0$ | $Vcx0$ |
| ⋮ | ⋮ | ⋮ | ⋮ |
| $txi$ | $Vaxi$ | $Vbxi$ | $Vcxi$ |
| ⋮ | ⋮ | ⋮ | ⋮ |
| $tz1$ | $Vaz1$ | $Vbz1$ | $Vcz1$ |

FIG. 10

| TIME | SENSOR A | SENSOR B | SENSOR C |
|---|---|---|---|
| $tw0$ | $Vaw0$ | $Vbw0$ | $Vcw0$ |
| ⋮ | ⋮ | ⋮ | ⋮ |
| $twi$ | $Vawi$ | $Vbwi$ | $Vcwi$ |
| ⋮ | ⋮ | ⋮ | ⋮ |
| $ty1$ | $Vay1$ | $Vby1$ | $Vcy1$ |

FIG. 11

| MAINTENANCE WORK NO. | MAINTENANCE DETAIL | MAINTAINED PART NO. |
|---|---|---|
| M1 | C1 | P01,P02 |
| M2 | C2 | P03 |
| ⋮ | ⋮ | ⋮ |

FIG. 12

| MAINTAINED PART NO. | PART COST | WORK COST | WORK TIME |
|---|---|---|---|
| P01 | PC01 | WC01 | WT01 |
| P02 | PC02 | WC02 | WT02 |
| P03 | — | WC03 | WT03 |
| ⋮ | ⋮ | ⋮ | ⋮ |

| ANOMALY TYPE | MAINTENANCE TYPE | FIRST GRACE PERIOD | CORRECTIVE MAINTENANCE COST |
|---|---|---|---|
| S1 | CORRECTIVE | RL_1 | MC_1 |
| S1 | CORRECTIVE | RL_2 | MC_2 |
| S1 | CORRECTIVE | RL_3 | MC_3 |

| ANOMALY TYPE | MAINTENANCE TYPE | SECOND GRACE PERIOD | PREVENTIVE MAINTENANCE COST |
|---|---|---|---|
| S1 | PREVENTIVE | RL_4 | MC_4 |
| S1 | PREVENTIVE | RL_5 | MC_5 |
| S1 | PREVENTIVE | RL_6 | MC_6 |
| S1 | PREVENTIVE | RL_7 | MC_7 |
| S1 | PREVENTIVE | RL_8 | MC_8 |
| S1 | PREVENTIVE | RL_9 | MC_9 |

MAINTENANCE MANAGEMENT DEVICE FOR OPERATING MACHINERY

TECHNICAL FIELD

The present invention relates to a maintenance management device for operating machinery, the device diagnosing whether an anomaly has occurred in sensor data of the operating machinery.

BACKGROUND ART

Operating machinery (working machines) such as excavators and dump trucks employed in mines is required to be operating 24 hours a day. If the machines are stopped due to failures, their shutdown could significantly impact on ongoing operations. In order to keep up the sound operation status, maintenance should be performed frequently. This maintenance generally involves scheduled one mainly in reference to the operation hours of machinery. The machine parts specified by design criteria are inspected, repaired, or replaced with new parts in accordance with the operation hours of the machines involved.

In recent years, the above-mentioned scheduled maintenance has been supplemented with condition-based maintenance (CBM; e.g., see Patent literature 1). In it, the data collected from diverse sensors mounted on the operating machine are subjected to diagnosis so that an abnormality of the machine will be detected earlier and the machine will be properly maintained before it breaks down. This practice is intended to prevent an unexpected outage of the machine between instances of scheduled maintenance so that the impact of the outage, should it occur, is minimized.

PRIOR ART LITERATURE

Patent Literature

[Patent Literature 1]
WO2009/020229

SUMMARY OF THE INVENTION

Problem to be Solved by the Invention

In mines of a relatively large scale, the traffic control system for operating machinery known as the dispatch system is used. This traffic control system involves transmitting operation information and machine information from operating machinery to a server via a radio communication system. These items of information are displayed on a control screen monitored by an administrator (dispatcher). Upon recognizing an operating machine outage, the administrator communicates through radio with the driver of the stopped machine to check detailed conditions and gives instructions accordingly to the maintenance personnel at the mine for maintenance work on the machine. That is, in many cases in the past, measures used to be taken to deal with the machines only after they have failed.

If the above-mentioned condition-based maintenance is introduced, the machines will be able to be diagnosed to have any error before an outage is actually incurred. However, upon recognizing an error of the machine, the administrator must decide whether to stop the machine immediately for preventive maintenance (maintenance before the occurrence of failure) or to wait for the timing of the next scheduled maintenance. The decision requires taking into consideration not only the grace period leading up to the outage but also maintenance cost. The reason is that if any machine is stopped for preventive maintenance, the production efficiency becomes lower and damaging cost is incurred accordingly.

The present invention has been made in view of the above circumstances, and one of the objectives of the invention is to provide a maintenance management device for operating machinery, the device providing support in determining the timing of maintaining the machinery.

Means for Solving the Problem (1) In order to achieve the above object, the present invention provides a maintenance management device for operating machinery, the maintenance management device being located at a distance from the operating machinery and collecting sensor data therefrom. The maintenance management device includes: an error status diagnosis unit which diagnoses whether an anomaly has occurred in the sensor data of the operating machinery; a grace period estimation unit which, if the error status diagnosis unit has diagnosed that an anomaly has occurred, estimates a first grace period leading up to occurrence of a failure, and/or a second grace period over which preventive maintenance may be postponed without the failure; a maintenance cost estimation unit which estimates cost of corrective maintenance incurred when the failure has occurred after elapse of the first grace period, and/or cost of preventive maintenance incurred when the second grace period has elapsed without the failure; and a screen display unit which displays a combination of the first grace period and the cost of the corrective maintenance, and/or a combination of the second grace period and the cost of the preventive maintenance.

The present invention, when an anomaly is diagnosed to have occurred in the sensor data of the operating machinery, estimates and displays the grace period and the cost of maintenance.

Specifically, what is estimated for example is the first grace period leading up to the occurrence of a failure, as well as the cost of corrective maintenance incurred when the failure has occurred after the elapse of the first grace period. These estimates are displayed in combination, which allows the administrator to determine the timing of maintenance in view of the grace period leading up to the occurrence of the failure. In addition to the grace period leading up to the failure occurrence, the cost of corrective maintenance may be taken into account in determining the timing of the maintenance. That is, when the cost of corrective maintenance is deemed to be high, for example, it may be determined that preventive maintenance be carried out earlier than usual to prevent the occurrence of a failure. As another example, when the cost of the corrective maintenance is deemed to be low, it may be determined that preventive maintenance be postponed so as to prevent a drop in production efficiency resulting from shutdown of the machinery for the sake of the preventive maintenance.

As another example, what is estimated is the second grace period over which preventive maintenance may be postponed without a failure, as well as the cost of preventive maintenance incurred after the elapse of the second grace period without occurrence of a failure. These estimates are displayed in combination, which allows the administrator to determine the timing of maintenance in view of the extra time over which preventive maintenance may be postponed. In addition to the extra time over which to postpone preventive maintenance, the cost of preventive maintenance may be taken into account in determining the timing of the maintenance. That is, if delaying the timing of preventive maintenance is found to boost the cost of the preventive maintenance, for example, it may be determined that preventive maintenance be performed earlier than usual.

The present invention, in the manner described above, provides support in determining the timing of maintenance for the operating machinery.

(2) Preferably, the maintenance management device explained in paragraph (1) above further includes: a case data storage unit which stores in advance a plurality of failure case data each including a time at which a failure occurred, sensor data in use before the failure occurred, and a type of the anomaly presaging the failure; and a case data extraction unit which, if the error status diagnosis unit has diagnosed the anomaly has occurred, extracts the failure case data including the type of the anomaly. The grace period estimation unit acquires an occurrence time of a past anomaly by collating sensor data, employed by the error status diagnosis unit, in use when current anomaly occurred with the sensor data, included in each of the failure case data extracted by the case data extraction unit, in use before a past failure occurred, the grace period estimation unit calculating a difference between a time at which the past anomaly occurred and a time at which a corresponding past failure occurred as the first grace period starting from an occurrence time of the current anomaly.

(3) Preferably, the maintenance management device explained in paragraph (1) further includes: a case data storage unit which stores in advance the plurality of failure case data each including the time at which the failure occurred, the type of the anomaly presaging the failure, and a time at which the anomaly occurred; and a case data extraction unit which, if the error status diagnosis unit has diagnosed that the anomaly has occurred, extracts the failure case data including the type of the anomaly. The grace period estimation unit calculates the difference between the time, included in each of the failure case data extracted by the case data extraction unit, at which the past anomaly occurred and the time at which the past failure occurred, as the first grace period starting from the occurrence time of the current anomaly.

(4) Preferably, in the maintenance management device explained in paragraph (2) or (3) above, upon elapse of time since the time at which the current anomaly occurred until a present time, the grace period estimation unit calculates the first grace period starting from the present time on a basis of the first grace period starting from the occurrence time of the current anomaly.

(5) Preferably, in the maintenance management device explained in any one of paragraphs (2) through (4) above, each of the failure case data stored in the case data storage unit includes information on the cost of the corrective maintenance. The maintenance cost estimation unit acquires the cost of the corrective maintenance based on the information regarding the cost of the corrective maintenance included in each of the failure case data extracted by the case data extraction unit. The screen display unit displays a combination of the cost of the corrective maintenance and the first grace period acquired on a basis of each of the failure case data extracted by the case data extraction unit.

(6) Preferably, the maintenance management unit explained in any one of paragraphs (1) through (5) above further includes: a case data storage unit which stores in advance a plurality of preventive maintenance case data each including the time at which the preventive maintenance was performed, sensor data in use before the preventive maintenance is carried out, and the type of the anomaly prompting the preventive maintenance; and a case data extraction unit which, if the error status diagnosis unit has diagnosed that the anomaly has occurred, extracts the preventive maintenance case data including the type of the anomaly. The grace period estimation unit acquires the time at which the past anomaly occurred by collating sensor data, employed by the error status diagnosis unit, in use when the current anomaly occurred with the sensor data, included in each of the preventive maintenance case data extracted by the case data extraction unit, in use before the past preventive maintenance is carried out, the grace period estimation unit calculating the difference between the time at which the past anomaly occurred and the time at which the corresponding past preventive maintenance was performed as the second grace period starting from the occurrence time of the current anomaly.

(7) Preferably, the maintenance management device explained in any one of paragraphs (1) through (5) above further includes: a case data storage unit which stores in advance the plurality of preventive maintenance case data each including the time at which the preventive maintenance was performed, the type of the anomaly prompting the preventive maintenance, and the time at which the anomaly occurred; and a case data extraction unit which, if the anomaly status diagnosis unit has diagnosed that an anomaly has occurred, extracts the preventive maintenance case data including the type of the anomaly. The grace period estimation unit calculates the difference between the time, included in each of the preventive maintenance case data extracted by the case data extraction unit, at which the past anomaly occurred and the time at which the past preventive maintenance was performed, as the second grace period starting from the occurrence time of the current anomaly.

(8) Preferably, in the maintenance management device explained in paragraph (6) or (7) above, upon the elapse of the time since the time at which the current anomaly occurred until the present time, the grace period estimation unit calculates the second grace period starting from the present time on a basis of the second grace period starting from the occurrence time of the current anomaly.

(9) Preferably, in the maintenance management device explained in any one of paragraphs (6) through (9) above, each of the preventive maintenance case data stored in the case data storage unit includes information on the cost of preventive maintenance. The maintenance cost estimation unit acquires the cost of preventive maintenance based on the information on the cost of preventive maintenance included in each of the preventive maintenance case data extracted by the case data extraction unit. The screen display unit displays a combination of the cost of preventive maintenance and the second grace period acquired on a basis of each of the preventive maintenance case data extracted by the case data extraction unit.

(10) Preferably, the maintenance management device explained in paragraph (5) or (9) above further includes a risk map generation unit which generates a risk map in which are indicated the combination of the cost of corrective maintenance and the first grace period acquired on the basis of each of the failure case data extracted by the case data extraction unit, and/or the combination of the cost of preventive maintenance and the second grace period acquired on the basis of each of the preventive maintenance case data extracted by the case data extraction unit, in a coordinate system having one coordinate axis representing grace period and another coordinate axis denoting maintenance cost. The screen display unit displays the risk map.

(11) Preferably, in the maintenance management device explained in paragraph (10) above, the risk map generation unit generates the risk map in the coordinate system divided into a plurality of zones, each of the zones indicating a number of a combination of the first grace period and the cost of corrective maintenance and/or a number of a combination of the second grace period and the cost of preventive maintenance, the combinations being classified into each zone.

(12) Preferably, in the maintenance management device explained in paragraph (10) or (11) above, the screen display unit indicates a timing of scheduled maintenance on the risk map.

Advantage of the Invention

The present invention provides support in determining the timing of maintenance for operating machinery.

BRIEF DESCRIPTION OF THE DRAWINGS

FIG. 3 is a block diagram showing a functional structure of a maintenance management device as an embodiment of the present invention.

FIG. 4 is a diagram tabulating diagnostic criterion data in the embodiment of the present invention.

FIG. 10 is a diagram tabulating case sensor data as part of preventive maintenance case data in the embodiment of the present invention.

FIG. 11 is a diagram constituting a maintenance work data table in the embodiment of the present invention.

FIG. 12 is a diagram constituting a cost data table in the embodiment of the present invention.

MODE FOR CARRYING OUT THE INVENTION

An embodiment of the present invention is explained below with reference to the accompanying figures.

Figure 1:
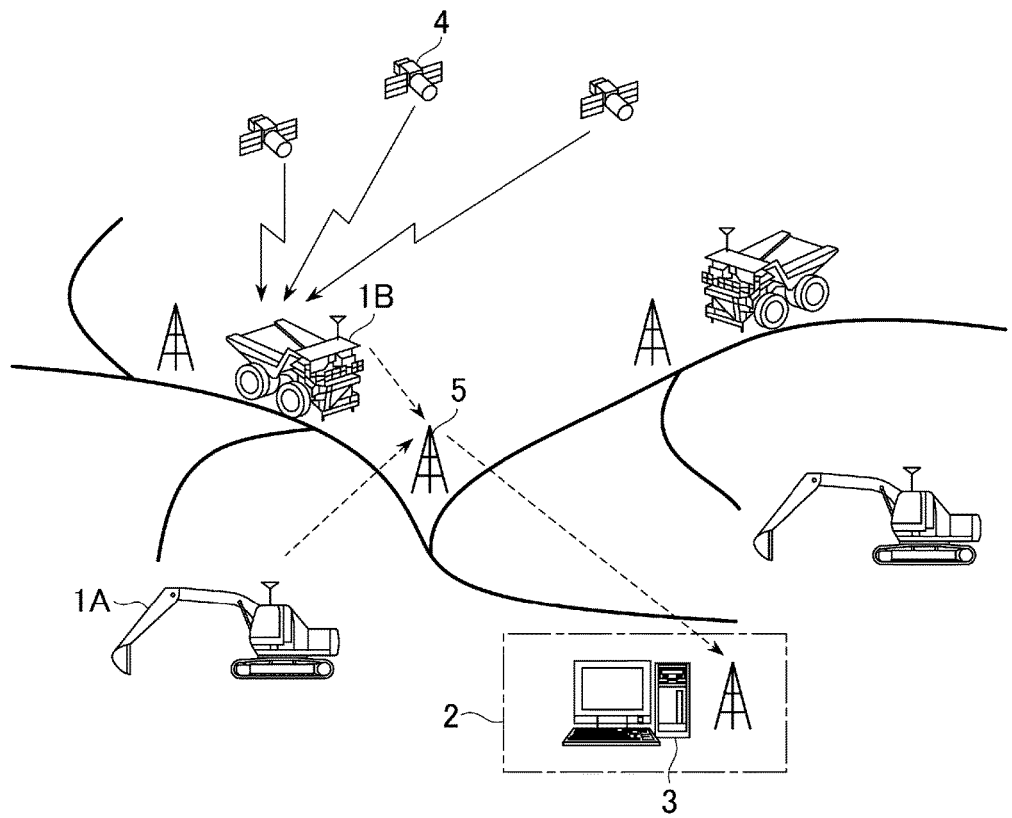
FIG. 1 is a schematic diagram showing a configuration of a traffic control system to which the present invention is applied.
Figure 2:
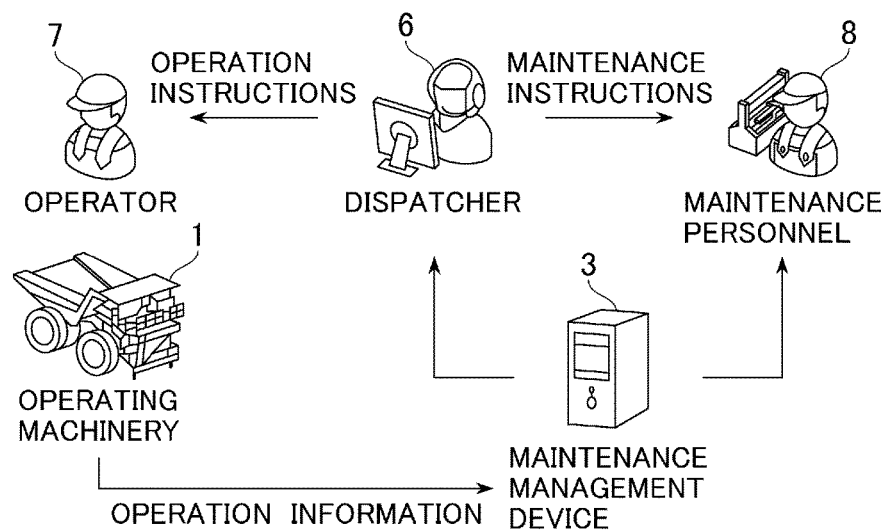
FIG. 2 is a schematic diagram showing flows of information along with the configuration of the traffic control system to which the present invention is applied.

FIG. 1 is a schematic diagram showing the configuration of the traffic control system to which the present invention is applied. FIG. 2 is a schematic diagram showing flows of information along with the configuration of the traffic control system to which the present invention is applied.

As shown in FIGS. 1 and 2, operating machines (working machines) 1 such as excavators 1A and dump trucks 1B are used at a quarry of a mine. A traffic control system is used to control these operating machines 1. In this traffic control system, a maintenance management device 3 is installed in a management office close to or away from the quarry. The operating machines 1 are each equipped with various sensors (not shown) and a position acquisition device (not shown) that acquires the position of the machine in question with the use of GPS satellites 4. Operation information (specifically, position, operation hours, and data from various sensors) and machine information (specifically, machine type and machine number) are transmitted to the maintenance management device 3 via a radio communication system (specifically, such as radio communication devices on the side of the operating machines 1, relay stations 5, and a radio communication device on the side of the management office 2). The maintenance management device 3 displays a control screen (not shown) indicating the information collected from the individual operating machines 1. An administrator 6 (dispatcher) monitors the control screen. After making decisions on the basis of the information shown on the control screen, the administrator 6 issues operating instructions to the operators 7 of the operating machines 1 and maintenance instructions to maintenance personnel 8. In accordance with the maintenance instructions, the maintenance personnel 8 conduct maintenance work on the operating machines 1. The maintenance personnel 8 may carry a portable terminal (not shown) that receives and displays the information from the maintenance management device 3 and may proceed with maintenance work in accordance with the information displayed on the portable terminal.

The maintenance management device 3 diagnoses whether or not an anomaly has occurred in various sensor data collected from the individual operating machines 2 and, if any anomaly is determined to have occurred, displays error information (to be detailed later). Furthermore, the maintenance management device 3 estimates a grace period and the cost of maintenance in accordance with various items of error information, and displays the estimates. Specifically, the maintenance management device 3 estimates, for example, the first grace period leading up to the occurrence of a failure and the cost of corrective maintenance incurred when the failure has occurred after the elapse of the first grace period, and displays these estimates in combination. As another example, the maintenance management device 3 estimates the second grace period over which preventive maintenance may be postponed without a failure, and the cost of preventive maintenance incurred after the elapse of the second grace period without a failure, and displays these estimates in combination. More details will be explained below.

FIG. 3 is a block diagram showing a functional structure of the maintenance management device 3 making up the present embodiment of the present invention.

As shown in FIG. 3, the maintenance management device 3 includes an operation information input unit 9, a diagnostic criterion data storage unit 10, an error status diagnosis unit 11, a case data storage unit 12, a case data extraction unit 13, a grace period estimation unit 14, a maintenance cost estimation unit 15, a risk map generation unit 16, and a screen display unit 17.

The operation information input unit 9 inputs operation information (specifically, the position and operation hours of the operating machine 1 and the sensor data therefrom) that is collected from each operating machine 1 and associated with its machine information. The operation information input unit 9 outputs part of the operation information associated with the machine information to the screen display unit 17 for display, and also outputs the sensor data associated with the machine information to the error status diagnosis unit 11.

The diagnostic criterion data storage unit 10 stores diagnostic criterion data 18 (see FIG. 4) in advance. On the basis of the stored diagnostic criterion data 18, the error status diagnosis unit 11 diagnoses whether an anomaly (i.e., presage of a failure) has occurred in the sensor data input from the operation information input unit 9 (in other words, whether there has occurred an issue not serious enough to hamper the operation of the operating machine 1). The items of the diagnostic criterion data 18 are made of an anomaly type, a diagnostic method, a sensor type, and criterion data. In FIG. 4, a diagnostic criterion record constituting each line represents one diagnostic process. For each anomaly type, one or multiple diagnostic records are prepared beforehand. Which diagnostic process is to be performed on the basis of which diagnostic criterion record has been selectively established preliminarily.

Figure 5:
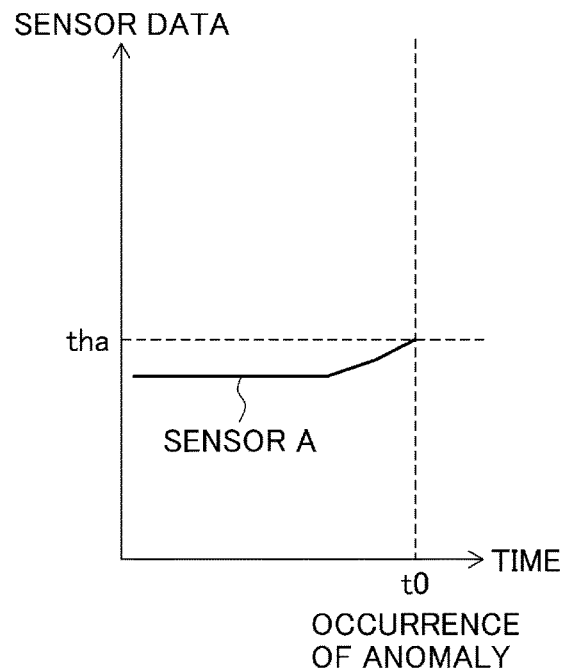
FIG. 5 is a timing chart of sensor data regarding the embodiment of the present invention and indicating the time at which the current anomaly occurred, the occurrence time being acquired by means of the threshold determination method.

Some specific examples of the diagnostic process will be explained below. For example, if the diagnostic process is to be performed on the basis of a diagnostic criterion record 19*a* shown in FIG. 4 (in other words, if the threshold determination method is to be used for the diagnosis), the data from a sensor A input from the operation information input unit 9 is used in conjunction with reference data "tha" used as the threshold value. It is then diagnosed whether an anomaly S1 has occurred by determining if the data from the sensor A has reached the threshold value "tha." And as shown in FIG. 5 for example, time "t0" at which the data from the sensor A has reached the threshold value "tha" is acquired as the occurrence time of the anomaly S1 (specifically, time t0 is acquired as the date and time of occurrence or as the time of occurrence in reference to the operation hours).

Figure 6:
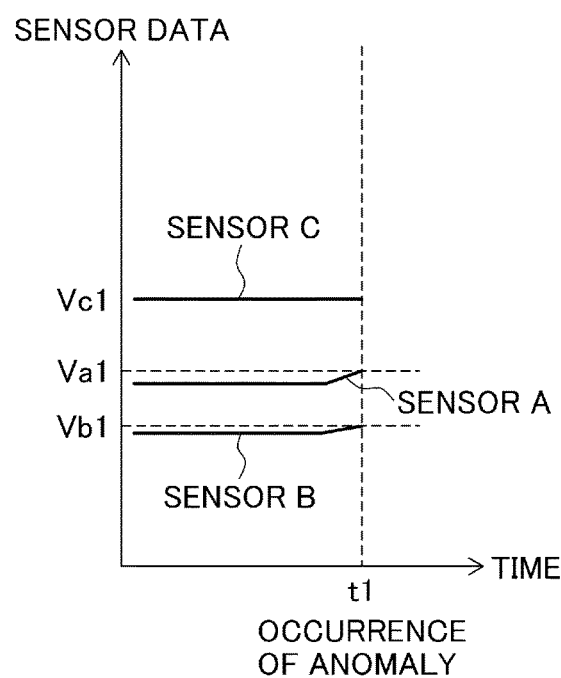
FIG. 6 is a timing chart of current sensor data regarding the embodiment of the present invention and indicating the time at which the current anomaly occurred, the occurrence time being acquired by means of the k-average method.

As another example, if the diagnostic process is to be performed on the basis of a diagnostic criterion record 19*b* shown in FIG. 4 (in other words, if the K-average method is to be used for the diagnosis), the data from the sensor A, data from a sensor B, and data from a sensor C input from the operation information input unit 9 are used. The K-average method (K-menas method) is a data classification technique that involves classifying multivariate data without instructions, with each item of the input data regarded as a point in a multivariate space so that a cluster (lump) of data therein may be found on the basis of the Euclidean distances between the points. In this example, the sensor A data, sensor B data, and sensor C data are handled as multivariate data. A cluster of data generated from chronologically arranged data in the normal state has been acquired beforehand and stored as criterion data "datafile0" in advance. It is then diagnosed whether the anomaly S1 has occurred by determining whether the sensor A data, sensor B data, and sensor C data input from the operation information input unit 9 are included in the above-mentioned cluster of data in the normal state, or whether the spatial distance from the cluster is long or short (in other words, whether the input data have deviated from the data in the normal state). And as shown in FIG. 6, time t1 at which the sensor A data, sensor B data, and sensor C data are not found included in the cluster of data in the normal state or at which their spatial distances from the cluster have become inordinately long is acquired as the occurrence time of the anomaly S1 (specifically, time t1 is acquired as the date and time of occurrence or as the time of occurrence in reference to the operation hours).

Upon diagnosing that an anomaly has occurred, the error status diagnosis unit 11 outputs error information (specifically, items such as anomaly type and anomaly occurrence time) to the screen display unit 17 in association with the machine information. In response, the screen display unit 17 displays an error screen (not shown) showing the items of the error information. Also when diagnosing that an anomaly has occurred, the error status diagnosis unit 11 outputs to the case data extraction unit 13 the type of the anomaly in question, the occurrence time of the anomaly, and the sensor data at the anomaly occurrence time in association with the machine information. Specifically, if the occurrence of an anomaly is diagnosed in the diagnostic process based on the above-described diagnostic criterion record 19*b* for example, the anomaly type "S1," anomaly occurrence time "t1", in addition to sensor A data "Va1," sensor B data "Vb1," and sensor C data "Vc1" at the anomaly occurrence time t1 are output to the case data extraction unit 13 in association with the machine information.

Figures 7, 8, 9:
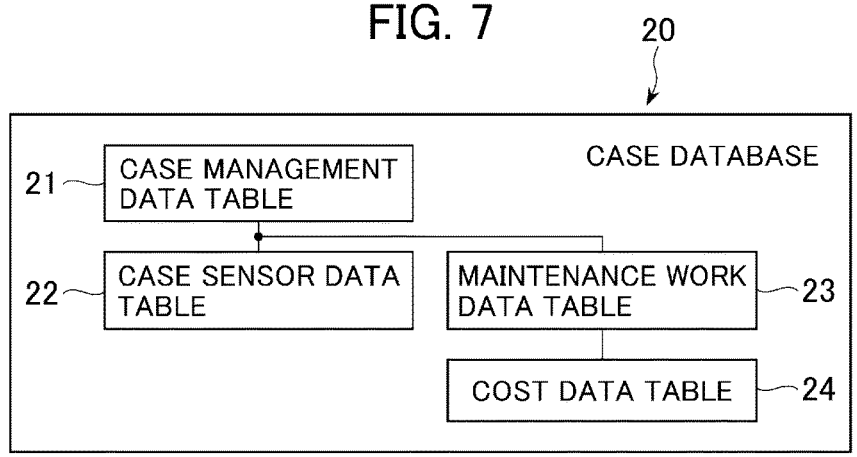
FIG. 7 is a block diagram showing a structure of a case database in the embodiment of the present invention.
FIG. 8 is a diagram constituting a case management data table in the embodiment of the present invention.
FIG. 9 is a diagram tabulating case sensor data as part of failure case data in the embodiment of the present invention.

The case data storage unit 12 that constitutes a case database 20 such as the one shown in FIG. 7 stores in advance multiple case data items (specifically, failure case data regarding the instances in which corrective maintenance has been performed after a failure occurred, and preventive maintenance case data regarding the instances in which preventive maintenance has been carried out before the occurrence of a failure). The case database 20 is made up of a case management data table 21, a case sensor data table 22, a maintenance work data table 23, and a cost data table 24 which are associated with one another.

The case management data table 21 (see FIG. 8) has as the data items a case number, an anomaly type, a maintenance type, a time for implementation of preventive maintenance, a failure occurrence time, and a maintenance work number. In FIG. 8, a case management record making up each line constitutes part of the data on each case. Specifically, a case management record in which the maintenance type is "corrective" and which includes a failure occurrence time makes up part of the failure case data (in other words, corrective maintenance case data). A case management record in which the maintenance type is "preventive" and which includes a time for implementation of preventive maintenance makes up part of the preventive maintenance case data.

The case sensor data table 22 stores the case sensor data associated with each case management record (in other words, provided with the case number of each case management record). Specifically, a case management record in which the maintenance type is "corrective" and which includes a failure occurrence time stores the sensor data (see FIG. 9) prior to the failure occurrence time (e.g., tz1), constituting part of the failure case data. A case management record in which the maintenance type is "preventive" and which includes a time for implementation of preventive maintenance stores the sensor data (see FIG. 10) prior to the time for implementation of preventive maintenance (e.g., ty1), constituting part of the preventive maintenance case data.

The maintenance work data table 23 (see FIG. 11) has as the data items a maintenance work number, a maintenance detail, and a maintained part number. The maintenance work numbers in the maintenance work data table 23 are associated with the maintenance work numbers in the case management data table 21. The maintenance work record making up each line in FIG. 11 constitutes part of the data on each case.

The cost data table 24 (see FIG. 12) has as the data items a maintained part number, a part cost, a work cost, and a work time. The maintained part numbers in the cost data table 24 are associated with the maintained part numbers in the maintenance work data table 23. Maintenance work may or may not involve replacement of the parts. For this reason, some of the cost records each making up one line in FIG. 12 include both part cost and work cost; the other cost records include work cost but not part cost.

Incidentally, the maintenance work records and cost records associated with the case management records in which the maintenance type is "corrective" are information on corrective maintenance cost and thus constitute part of the failure case data. The maintenance work records and cost records associated with the case management records in which the maintenance type is "preventive" are information on preventive maintenance cost and thus make up part of the preventive maintenance case data.

When the error status diagnosis unit 11 diagnoses that an anomaly has occurred, the case data extraction unit 13 extracts the case data including the type of the anomaly in question. Specifically, the case data extraction unit 13 references the anomaly type (e.g., S1) input from the error status diagnosis unit 11 and extracts the case management records containing the same anomaly type from the case management data table 21. The case data extraction unit 13 proceeds to output the extracted case management records to the grace period estimation unit 14 in association with the anomaly occurrence time, the sensor data at the anomaly occurrence time, and the machine information input from the error status diagnosis unit 11. Also, the extracted case management records are output to the maintenance cost estimation unit 15 in association with the anomaly occurrence time and machine information input from the error status diagnosis unit 11.

Figure 13:
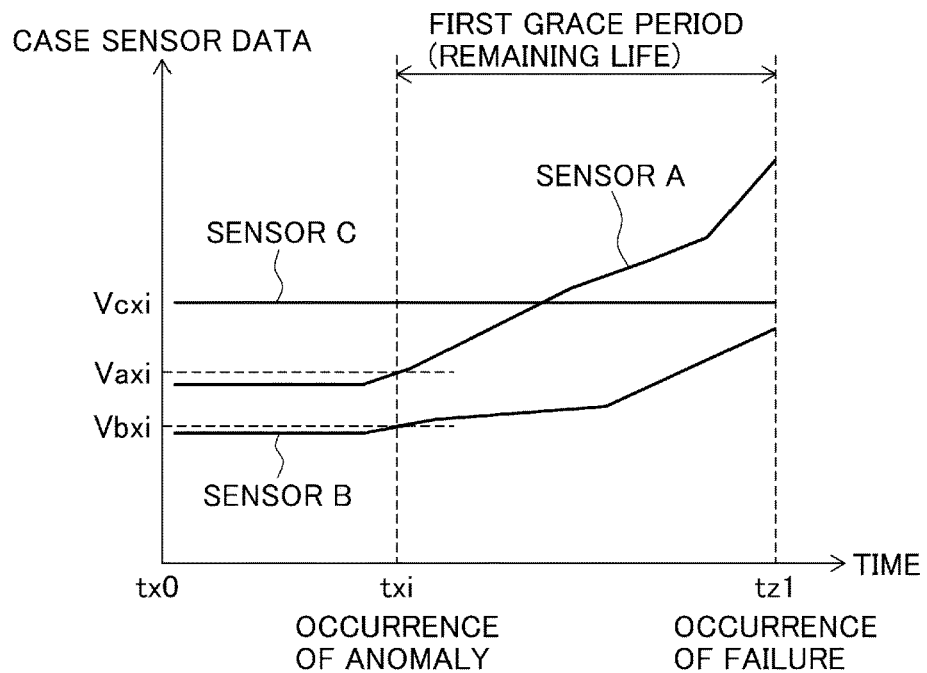
FIG. 13 is a diagram explaining the method by which to estimate the first grace period based on the failure case data in the embodiment of the present invention.

The grace period estimation unit 14 estimates the grace period corresponding to each of the case management records input from the case data extraction unit 13. For example, if the case management record input from the case data extraction unit 13 is one in which the maintenance type is "corrective," the grace period estimation unit 14 calculates the first grace period leading up to the occurrence of a failure. Specifically, consider the case in which the case management record 25a shown in FIG. 8 is input from the case data extraction unit 13 along with the sensor A data "Va1," sensor B data "Vb1," and sensor C data "Vc1" at the anomaly occurrence time t1. First, in the case sensor data table 22, a search is made for the sensor A data, sensor B data, and sensor C data associated with the case management record 25a and prior to the failure occurrence time tz1 (see FIG. 9). Second, the sensor A data Va1, sensor B data Vb1 and sensor C data Vc1 at the current anomaly occurrence time t1 are collated with the retrieved past sensor A data, sensor B data and sensor C data. Specifically, the spatial distances of the data in the multivariate space are calculated in the same manner as the above-mentioned K-average method before a search is made for the sensor data (Vaxi, Vbxi, Vcxi) having close spatial distances therebetween. This search allows a past anomaly occurrence time txi to be acquired as shown in FIG. 13. Then, calculating the difference between the past anomaly occurrence time txi and the corresponding past failure occurrence time tz1 enables the calculation of the first grace period (in other words, remaining life) starting from the current anomaly occurrence time. The first grace period thus calculated is associated with the corresponding case management record 25a (as well as with the anomaly occurrence time and machine information) before being output to the risk map generation unit 16.

Figure 14:
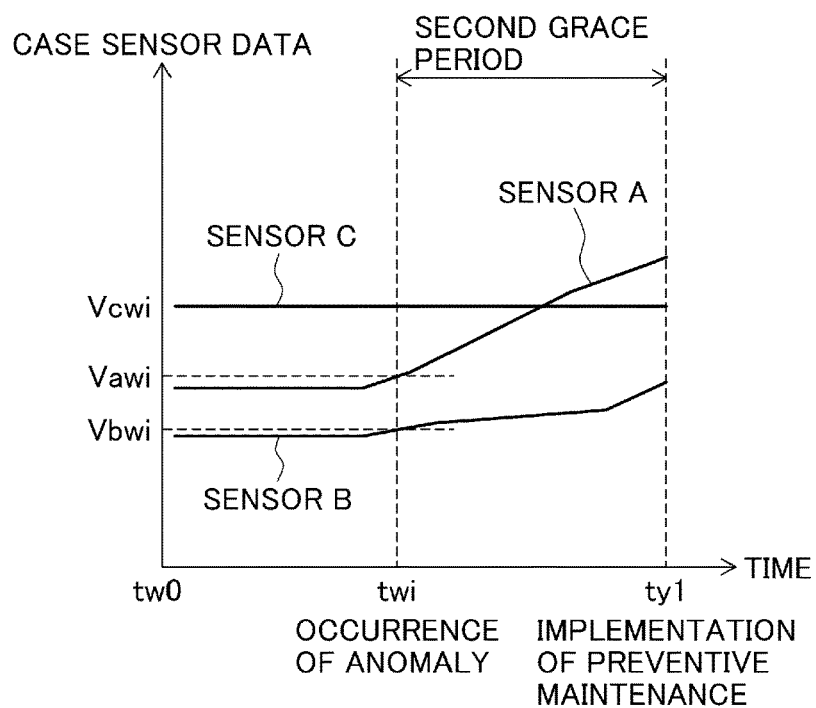
FIG. 14 is a diagram explaining the method by which to estimate the second grace period based on the preventive maintenance case data in the embodiment of the present invention.

Meanwhile, if the case management record input from the case data extraction unit 13 is one in which the maintenance type is "preventive," the grace period estimation unit 14 calculates the second grace period over which preventive maintenance may be postponed without a failure. Specifically, consider the case in which the case management record 25b shown in FIG. 8 is input along with the anomaly occurrence time "t1", the sensor A data "Va1," sensor B data "Vb1," and sensor C data "Vc1" at the anomaly occurrence time t1. First, in the case sensor data table 22, a search is made for the sensor A data, sensor B data, and sensor C data associated with the case management record 25b and prior to ty1 in the time for implementation of preventive maintenance (see FIG. 10). Second, the sensor A data Va1, sensor B data Vb1 and sensor C data Vc1 at the current anomaly occurrence time t1 are collated with the retrieved pas sensor A data, sensor B data and sensor C data. This search allows a past anomaly occurrence time twi to be acquired as shown in FIG. 14. Then, calculating the difference between the past anomaly occurrence time txi and ty1 which is the corresponding time for implementation of past preventive maintenance enables calculation of the second grace period starting from the current anomaly occurrence time. The second grace period thus calculated is associated with the corresponding case management record 25b (as well as with the anomaly occurrence time and machine information) before being output to the risk map generation unit 16.

The maintenance cost estimation unit 15 calculates the maintenance cost corresponding to each of the case management records input from the case data extraction unit 13. That is, the maintenance cost estimation unit 15 calculates the corrective maintenance cost upon receipt of the case management record in which the maintenance type is "corrective" (in other words, failure case data), and calculates the preventive maintenance cost given the case management record in which the maintenance type is "preventive" (in other words, preventive maintenance case data). Specifically, reference is first made to the maintenance work number (e.g., M1) of the case management records to retrieve the maintenance work records having the same maintenance work number from the maintenance work data table 23. Second, in reference to the maintained part numbers (e.g., "P01" and "P02") of the retrieved maintenance work records, a search is made for the cost records having the same maintained part numbers in the cost data table 24. The maintenance cost estimation unit 15 proceeds to calculate the maintenance cost by integrating the part costs (e.g., "PC01" and "PC02") and work costs (e.g., "WC01" and "WC01") of the retrieved cost records. The maintenance cost thus calculated is associated with the corresponding case management record (as well as with the anomaly occurrence time and machine information) before being output to the risk map generation unit 16.

Figures 15, 16, 17:
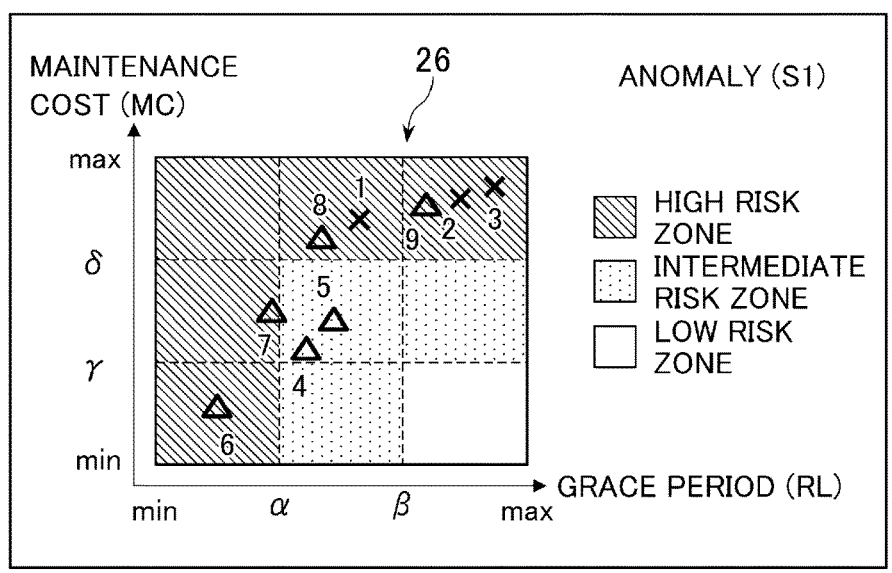
FIG. 15 is a diagram tabulating specific a combination of the first grace period and the cost of corrective maintenance acquired on the basis of each of the failure case data in the embodiment of the present invention.
FIG. 16 is a diagram tabulating specific a combination of the second grace period and the cost of preventive maintenance acquired on the basis of each of the preventive maintenance case data in the embodiment of the present invention.
FIG. 17 is a diagram showing a risk map screen displayed on the screen display unit in the embodiment of the present invention.

The risk map generation unit 16 inputs from the grace period estimation unit 14 the first or the second grace period associated with the case management record (as well as with the anomaly occurrence time and machine information), and inputs from the maintenance cost estimation unit 15 the corrective or preventive maintenance cost associated with the case management record (as well as with the anomaly occurrence time and machine information). As shown in FIG. 15 for example, the risk map generation unit 16 generates a combination of the first grace period and the corrective maintenance cost to which the case management record (as well as the anomaly occurrence time and machine information) is common, and classifies the combinations into groups according to the anomaly type of the case management record. Moreover, as shown in FIG. 16 for example, the risk map generation unit 16 generates combination of the second grace period and the preventive maintenance cost to which the case management record (as well as the anomaly occurrence time and machine information) is common, and classifies the combinations into groups according to the anomaly type of the case management record. The risk map generation unit 16 proceeds to generate a risk map 26 (see FIG. 17) for each anomaly type and to output the generated risk map 26 to the screen display unit 17 for display on the screen.

The risk map 26 shows the combination of the grace period and the maintenance cost which has been obtained in accordance with the individual case data in a two-dimensional coordinate system with its coordinate axes each representing grace period and maintenance cost. In the present embodiment, the combination of the first grace period and the corrective maintenance cost which has been acquired on the basis of the individual failure case data (indicated by the crosses "x" in FIG. 17) and the combination of the second grace period and the preventive maintenance cost which has been obtained on the basis of the individual preventive maintenance case data (indicated by the triangles "Δ" in FIG. 17) are plotted distinguishably in the same coordinate system.

Moreover, in the present embodiment, the grace period is divided into multiple levels (ranges), the maintenance cost into multiple levels (ranges), and the entire coordinate system into multiple risk zones (areas) that are distinguishable from one another by color tone, for example. Specifically, as shown in FIG. 17, the grace period (RL) is separated into a low level ($RL<\alpha$), an intermediate level ($\alpha \leq RL<\beta$), and a high level ($\beta \leq RL$); whereas the maintenance cost (MC) is segmented into a low level ($MC<\gamma$), an intermediate level ($\gamma \leq MC<\delta$), and a high level ($\delta \leq MC$). The entire coordinate system is divided into a high risk zone (which meets the conditions $RL<\alpha$ or $\delta \leq MC$), an intermediate risk zone (which meets the conditions $\alpha \leq RL<\beta$ and $MC<\delta$, or $\beta \leq RL$ and $\gamma \leq MC<\delta$), and a low risk zone (which meets the conditions $\beta \leq RL$ and $MC<\gamma$).

The operation and the effects of the present embodiment will be explained below.

The maintenance management device 3 diagnoses whether an anomaly has occurred in the sensor data collected from the individual operating machines 1. If an anomaly is diagnosed to have occurred, the maintenance management device 3 displays an error screen indicating error information (specifically, anomaly type and anomaly occurrence time for example) in association with machine information. The display allows the administrator to recognize the error of the relevant operating machine 1.

Thereafter, the maintenance management device 3 extracts the failure case data or preventive maintenance case data having the same anomaly type. For example, after extracting the failure case data, the maintenance management device 3 estimates, on the basis of the extracted data, the first grace period leading up to the occurrence of a failure and the corrective maintenance cost incurred when the failure has occurred after the elapse of the first grace period. As another example, after extracting the preventive maintenance case data, the maintenance management device 3 estimates, on the basis of the extracted data, the second grace period over which preventive maintenance may be postponed without a failure and the preventive maintenance cost incurred when the second grace period has elapsed without a failure. The maintenance management device 3 proceeds to generate a risk map indicating the combination of the first grace period and the corrective maintenance cost and/or the combination of the second grace period and the preventive maintenance cost. When the administrator operates an operation unit such as a keyboard and a mouse to select the error information (and machine information) on the error screen and to designate display of the risk map, the maintenance management unit 3 displays a risk map screen indicating the corresponding risk map.

When, say, the combination of the first grace period and the corrective maintenance cost are displayed on the risk map in the above-described manner, the administrator can determine the timing of maintenance based on the past results of the grace period leading up to the occurrence of the failure. In determining the timing of maintenance, the administrator can take into account not only the grace period up to the failure occurrence but also the corrective maintenance cost. That is, if the corrective maintenance cost is deemed to be high for example, it can be determined that preventive maintenance be carried out earlier than usual so that there will not be a failure. As another example, if the corrective maintenance cost is considered low, it may be determined that preventive maintenance be postponed in order to avoid a decline in production efficiency caused by the stoppage of machinery for preventive maintenance.

When the risk map shows, say, the combination of the second grace period and the preventive maintenance cost, the administrator can determine the timing of maintenance based on the past results of the extra time over which preventive maintenance may be postponed (in other words, the grace period during which there will not be a failure occurring). In determining the timing of maintenance, the administrator can take into account not only the extra time over which preventive maintenance may be postponed but also the preventive maintenance cost. That is, if the preventive maintenance cost is considered high in the event of delayed timing of preventive maintenance, it may be determined that preventive maintenance be performed earlier than usual.

As a specific example, the above-mentioned risk map screen shown in FIG. 17 will be explained. This risk map screen has three combinations of the first grace period and the corrective maintenance cost (RL_1, MC_1), (RL_2, MC_2) and (RL_3, MC_3) shown to belong to the high risk zone. In the combination (RL_1, MC_1), the first grace period is at the intermediate level ($\alpha \leq RL\_1 < \beta$) and the corrective maintenance cost is at the high level ($\delta \leq MC\_1$). In the combinations (RL_2, MC_2) and (RL_3, MC_3), the first grace period is at the high level ($\beta \leq RL\_2$, $\beta \leq RL\_3$) and the corrective maintenance cost is at the high level ($\delta \leq MC\_2$, $\delta \leq MC\_3$). Also, the risk map screen has two combinations of the second grace period and the preventive maintenance cost (RL_4, MC_4) and (RL_5, MC_5) shown to belong to the intermediate risk zone. In these two combinations, the second grace period is at the intermediate level ($\alpha \leq RL\_4 < \beta$, $\alpha \leq RL\_5 < \beta$) and the preventive maintenance cost is at the intermediate level ($\gamma \leq MC\_4 < \delta$, $\gamma \leq MC\_5 < \delta$). The risk map screen further has four combinations of the second grace period and the preventive maintenance cost (RL_6, MC_6), (RL_7, MC_7), (RL_8, MC_8) and (RL_9, MC_9) shown to belong to the high risk zone. In the combination (RL_6, MC_6), the second grace period is at the low level ($RL\_6 < \alpha$) and the preventive maintenance cost is at the low level ($MC\_6 < \gamma$). In the combination (RL_7, MC_7), the second grace period is at the low level ($RL\_7 < \alpha$) and the preventive maintenance cost is at the intermediate level ($\gamma \leq MC\_7 < \delta$). In the combination (RL_8, MC_8), the second grace period is at the intermediate level ($\alpha \leq RL\_8 < \beta$) and the preventive maintenance cost is at the high level ($\delta \leq MC\_8$). In the combination (RL_9, MC_9), the second grace period is at the high level ($\beta \leq RL\_9$) and the preventive maintenance cost is at the high level ($\delta \leq MC\_9$).

Given the above risk map, the administrator may focus on the combination of the grace period and the maintenance cost (RL_1, MC_1), (RL_4, MC_4), (RL_5, MC_5) and (RL_8, MC_8) for example and determine that the timing of maintenance be preferably corresponding to or be prior to the grace period RL_4, RL_5, or RL_8. As another example, the administrator may focus on the combination of the grace period and the maintenance cost (RL_6, MC_6), (RL_7, MC_7) and (RL_8, MC_8) and determine that preventive maintenance be carried out earlier than usual because the cost of preventive maintenance can be higher if its timing is delayed.

In the manner described above, the present embodiment provides support in determining the timing of maintenance of the working machinery 1. This support will help alleviate the burden on the administrator.

Figure 18:
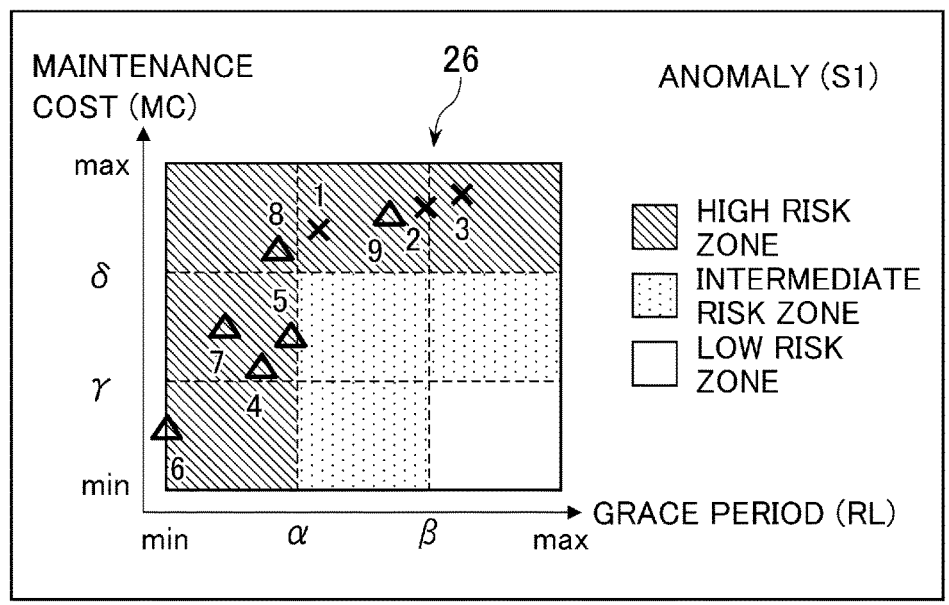
FIG. 18 is a diagram showing a transition state on the risk map screen displayed on the screen display unit in a first variation of the present invention.

The embodiment above has been explained in conjunction with the case where the grace period estimation unit 14 calculates the grace period starting from the occurrence time of the current anomaly and where the risk map generation unit 16 generates the risk map 26 showing the combination of the grace period thus calculated and the maintenance cost and then causes the screen display unit 17 to display the generated risk map 26. Alternatively, there may be provided diverse variations of the present invention in this respect without departing from the spirit and technical scope of the invention. For example, after the elapse of time from the occurrence of the current anomaly up to the present time (specifically, the current date and time or the current operation hours input from the operation information input unit 9), the grace period estimation unit 14 may calculate the difference between the occurrence time of the current anomaly and the present time and subtract the difference thus calculated from the grace period starting from the current anomaly occurrence time, thereby calculating the grace period starting from the present time. The risk map generation unit 16 may then generate the risk map 26 showing the combination of the grace period starting from the present time and the maintenance cost and cause the screen display unit 17 to display the risk map 26 thus generated. That is, the risk map 26 transitions over time from the state shown in FIG. 17 to that in FIG. 18 (i.e., the displayed data moves leftward). In this case, the administrator can determine that the time to perform preventive maintenance is approaching, given that the number of cases belonging to the intermediate risk zone has dropped while the number of cases belonging to the high risk zone is increasing.

Figure 19:
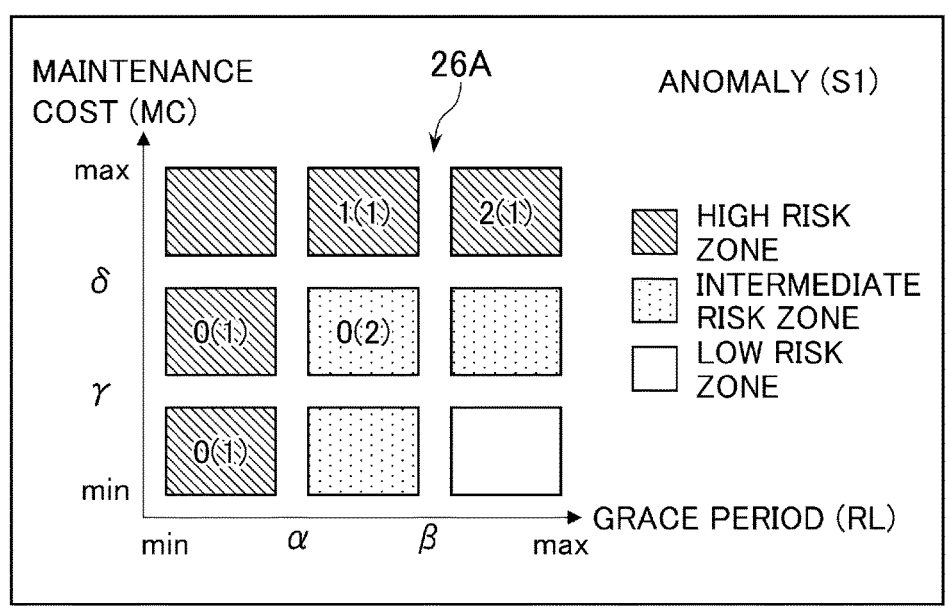
FIG. 19 is a diagram showing a risk map screen displayed on the screen display unit in a second variation of the present invention.

In addition, the embodiment above has been explained in conjunction with the case where, as shown in FIG. 17, the risk map generation unit 16 generates the risk map 26 plotting the combination of the grace period and the maintenance cost in the two-dimensional coordinate system and then causes the screen display unit 17 to display the risk map 26 thus generated. Alternatively, there may be provided diverse variations of the present invention in this respect without departing from the spirit and technical scope of the invention. For example, the risk map generation unit 16 may, as shown in FIG. 19, divide the coordinate system into a first region ($RL < \alpha$ and $MC < \gamma$), a second region ($RL < \alpha$ and $\gamma \leq MC < \delta$), a third region ($RL < \alpha$ and $\delta \leq MC$), a fourth region ($\alpha \leq RL < \beta$ and $MC < \gamma$), a fifth region ($\alpha \leq RL < \beta$ and $\gamma \leq MC < \delta$), a sixth region ($\alpha \leq RL < \beta$ and $\delta \leq MC$), a seventh region ($\beta \leq RL$ and $MC < \gamma$), an eighth region ($\beta \leq RL$ and $\gamma \leq MC < \delta$), and a ninth region ($\beta \leq RL$ and $\delta \leq MC$) to generate a risk map 26A showing the combination of the grace period and the maintenance cost classified into each of the different regions, and cause the screen display unit 17 to display the generated risk map 26A. In FIG. 19, the number of the combination of the first grace period and the corrective maintenance cost are shown outside the parentheses whereas the number of the combination of the second grace period and the preventive maintenance cost are shown parenthesized. Further, the first through the third regions, the sixth region, and the ninth region correspond to the high risk zone; the fourth, the fifth, and the eighth regions correspond to the intermediate risk zone; and the seventh region corresponds to the low risk zone. For that reason, the regions are shown distinguishably by use of color tone or the like depending on the risk zones as with the above-described embodiment. This variation of the present invention will also provide the same advantages as the above-described embodiment.

Figure 20:
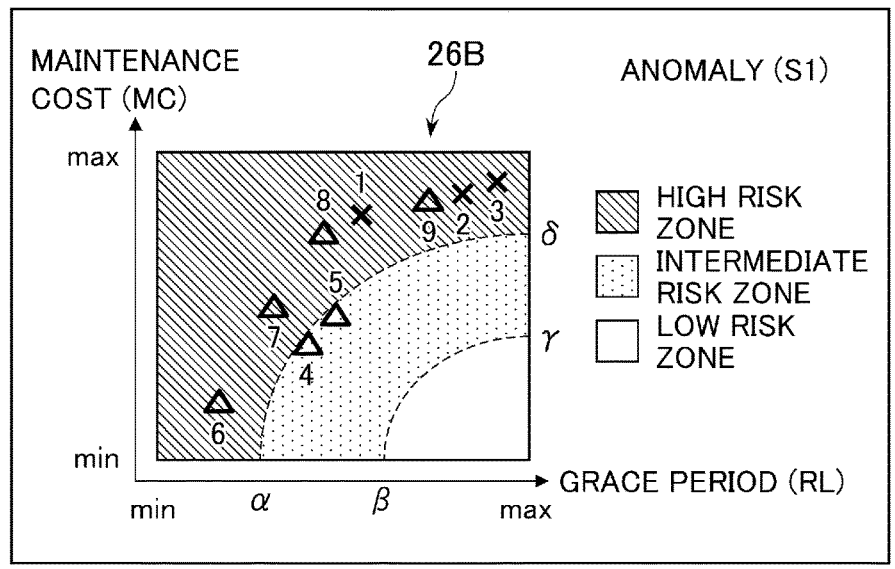
FIG. 20 is a diagram showing a risk map screen displayed on the screen display unit in a third embodiment of the present invention.

The embodiment above has also been explained in conjunction with the case where, as shown in FIG. 17, the high risk zone, the intermediate risk zone, and the low risk zone are distinguished from one another by use of dotted boundary lines. Alternatively, the high risk zone, the intermediate risk zone, and the low risk zone may be distinguished from one another by use of arc-like boundary lines. Specifically, as on a risk map 26B shown in FIG. 20, the low risk zone may be distinguished as a region in which the grace period is long and the maintenance cost is low, the region being bordered with a first arc [specifically, an arc having its centers defined by a maximum grace period MAX and a minimum maintenance cost MIN and its radii defined by a grace period axis (MAX−β) and a maintenance cost axis (γ−Min)]. The high risk zone may be distinguished as a region in which the grace period is short and the maintenance cost is high, the region being bordered with a second arc [specifically, an arc having its centers defined by the maximum grace period MAX and minimum maintenance cost MIN and its radii defined by the grace period axis (MAX−α) and maintenance cost axis (δ−MIN)]. The region between the first arc and the second arc may be distinguished as the intermediate risk zone. This variation will also provide the same advantages as the above-described embodiment.

Figure 21:
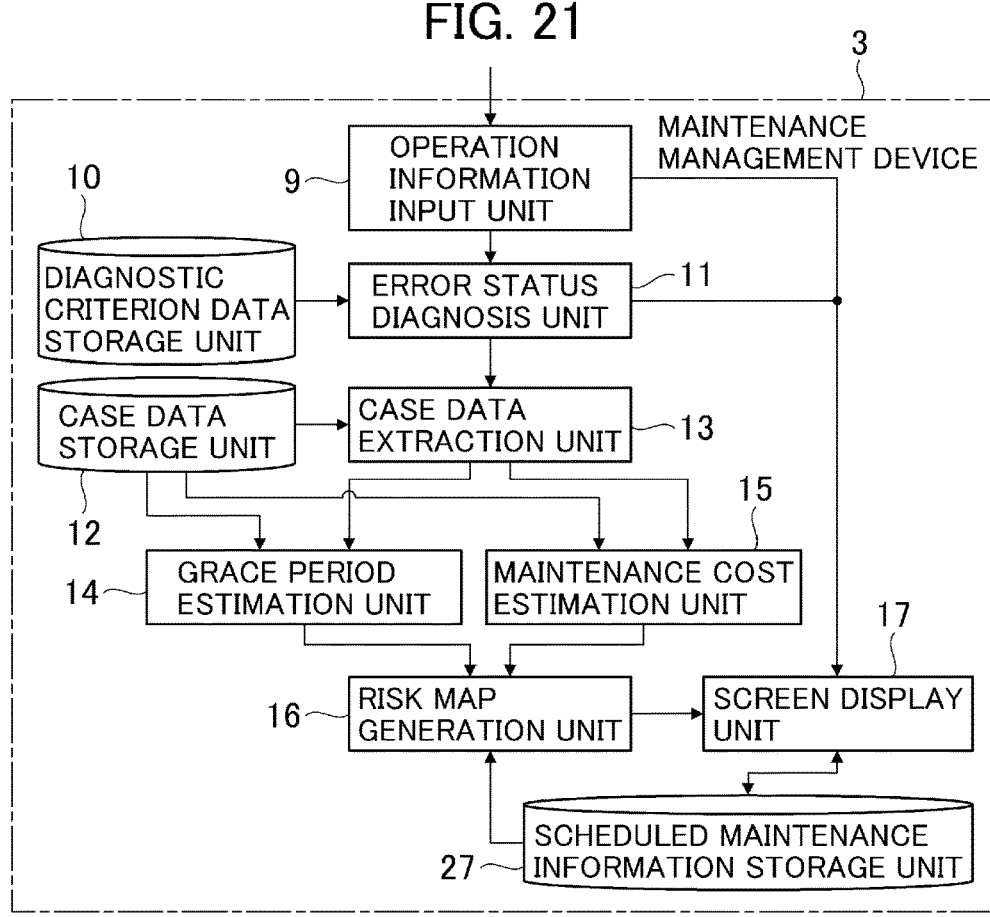
FIG. 21 is a block diagram showing a functional structure of a maintenance management device as a fourth embodiment of the present invention.

Although not explained specifically in connection with the above embodiment and variations, the maintenance management device 3 may be equipped with a scheduled maintenance information storage unit 27 as shown in FIG. 21. The scheduled maintenance information storage unit 27 may store such scheduled maintenance information as the intervals of scheduled maintenance recommended beforehand by the manufacturer or predetermined by operators or farther may store the time the scheduled maintenance regarding each of the operating machines 1 was previously held. The scheduled maintenance information provides the basis for calculating the timing of scheduled maintenance from the next time onwards. In one variation, the risk map generation unit 16 may generate the risk map 26 (or 26A, 26B) by changing the above-mentioned value α in a manner corresponding to the timing of the next scheduled maintenance and changing the value β in a manner corresponding to the timing after the next scheduled maintenance, and then cause the screen display unit 17 to display the generated risk map. That is, the risk zones may be changed in keeping with the timing of scheduled maintenance so as to indicate the timing of the scheduled maintenance on the risk map 26 (or 26A, 26B). In this case, the administrator may determine the timing of preventive maintenance while at the same time referencing the timing of scheduled maintenance. Specifically, as shown on the risk map screen in FIG. 17 for example, if preventive maintenance is carried out in keeping with the timing (α) of the next scheduled maintenance, the administrator can determine that the occurrence of a failure can be prevented with high probability; if preventive maintenance is performed in keeping with the timing (β) after the next scheduled maintenance, the administrator can determine that there is a possibility of a failure occurring before the scheduled maintenance held in accordance with that timing. It can also be determined that the cost of preventive maintenance performed in keeping with the timing (β) after the next scheduled maintenance is higher than that of preventive maintenance carried out in accordance with the timing (α) of the next scheduled maintenance.

Figure 22:
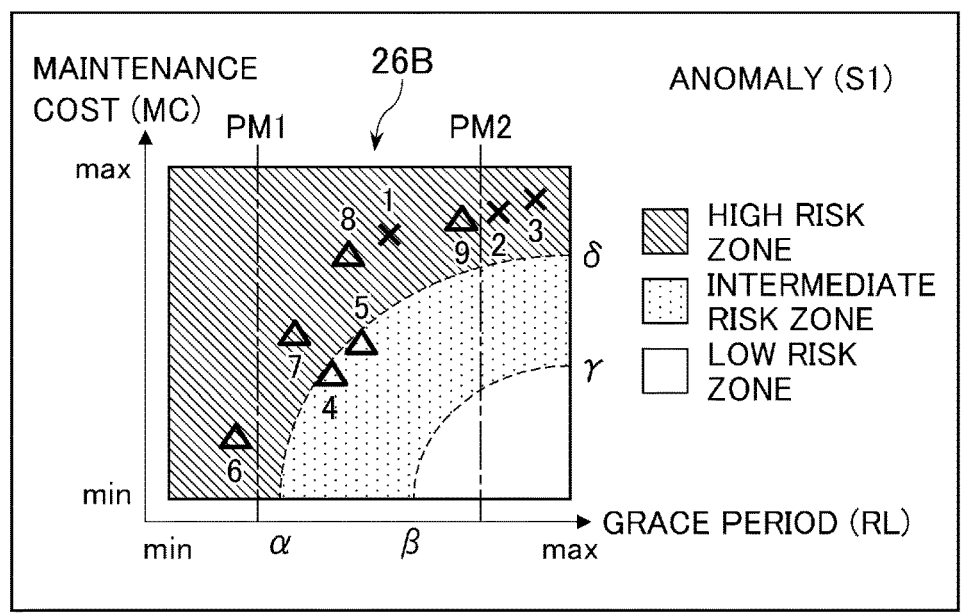
FIG. 22 is a diagram showing a risk map screen displayed on the screen display unit in a fifth embodiment of the present invention.

In another variation, as shown in FIG. 22, the screen display unit 17 may display timing lines PM1 and PM2 indicative of the timing of scheduled maintenance on the risk map 26B. In this case, too, the administrator can determine the timing of preventive maintenance while at the same time referencing the timing of scheduled maintenance. Specifically, if preventive maintenance is performed in keeping the timing (PM1) of the next scheduled maintenance, the administrator can determine that a failure is prevented with high probability; if preventive maintenance is carried out in accordance with the timing (PM2) after the next scheduled maintenance, the administrator can determine that there is a possibility of a failure occurring before such preventive maintenance is held. It can also be determined that the cost of preventive maintenance performed in keeping with the timing (PM2) after the next scheduled maintenance is higher than that of preventive maintenance carried out in accordance with the timing (PM1) of the next scheduled maintenance.

Figure 23:
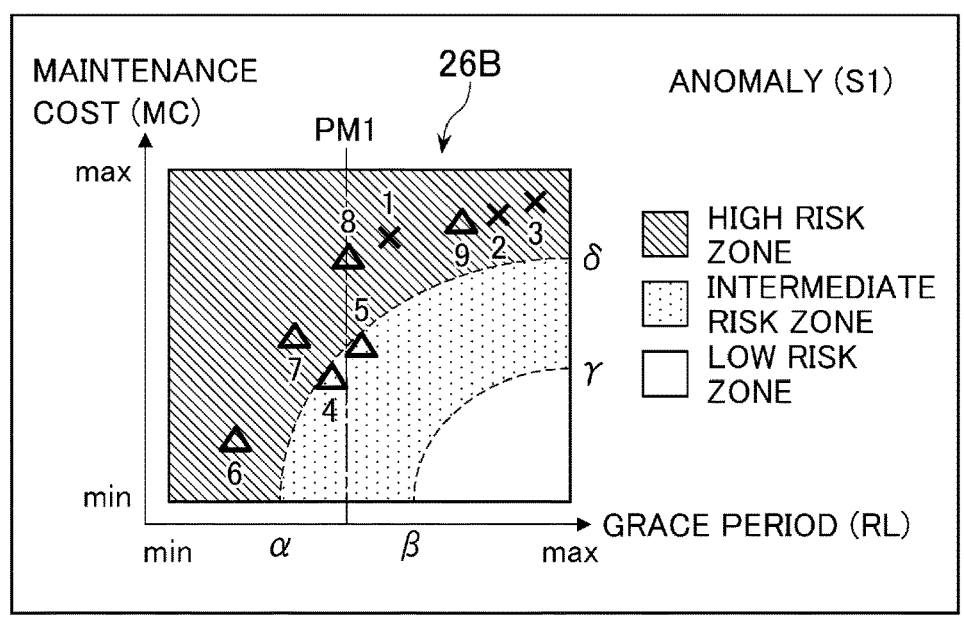
FIG. 23 is a diagram explaining how the scheduled timing is changed on the risk map screen in a sixth embodiment of the present invention.

The administrator can operate the operation unit such as a keyboard and a mouse in a manner moving the timing lines on the risk map 26B in the direction of the grace period axis (see FIG. 23). Moreover, in keeping with the changed timing lines, the administrator may calculate the intervals of scheduled maintenance while at the same time outputting the calculated intervals of scheduled maintenance to the scheduled maintenance information storage unit 27 to update the current intervals stored therein. That is, the established timing and intervals of scheduled maintenance may be changed by use of the risk map screen.

The embodiment and variations above have been explained in conjunction with the case where the combination of the first grace period and the corrective maintenance cost and the combination of the second grace period and the preventive maintenance cost are shown on the same risk map 26 (or 26A, 26B). Alternatively, the two sets of the combinations may be displayed on different risk maps (in other words, in separate coordinate systems). In this case, too, the same advantages as described above will be achieved.

The embodiment and variations above have been explained in conjunction with the case where the case data storage unit 12 stores the failure case data and preventive maintenance case data in advance. Alternatively, there may be provided diverse variations of the present invention in this respect without departing from the spirit and technical scope of the invention.

For example, the case data storage unit 12 may store only the failure case data beforehand. In this case, if the error status diagnosis unit 11 has diagnosed an anomaly has occurred, the case data extraction unit 13 extracts the failure case data including the type of the anomaly in question. The grace period estimation unit 14 calculates the first grace period on the basis of each of the extracted failure case data. The maintenance cost estimation unit 15 calculates the corrective maintenance cost on the basis of each of the extracted failure case data. The risk map generation unit 16 generates the risk map showing those combinations of the first grace period and the corrective maintenance cost which have been acquired on the basis of the individual failure case data, and then causes the screen display unit 17 to display the risk map thus generated. In this case, the same advantages as described above will be achieved as well.

As another example, the case data storage unit 12 may store only the preventive maintenance case data in advance. In this case, if the error status diagnosis unit 11 has diagnosed that an anomaly has occurred, the case data extraction unit 13 extracts the preventive maintenance case data including the type of the anomaly in question. The grace period estimation unit 14 calculates the second grace period on the basis of each of the preventive maintenance case data. The maintenance cost estimation unit 15 calculates the preventive maintenance cost on the basis of each of the extracted preventive maintenance case data. The risk map generation unit 16 generates the risk map showing those combinations of the second grace period and the corrective maintenance cost which have been acquired on the basis of the individual preventive maintenance case data, and then causes the screen display unit 17 to display the risk map thus generated. In this case, the same advantages as described above will also be realized.

Further, the embodiment and variations above have been explained in conjunction with the case where the risk map generation unit 16 is provided to generate and display the risk map 26 (or 26A, 26B). Alternatively, there may be provided diverse variations of the present invention in this respect without departing from the spirit and technical scope of the invention. For example, the risk map generation unit 16 may be replaced with a list generation unit (not shown) that generates a list (preferably supplemented with information on the risk zones to which the combination of the grace period and the maintenance cost belong) such as the above-described one in FIG. 15 or 16, and the list thus generated may be displayed on the screen display unit 17. This variation also provides support in determining the timing of maintenance of the operating machinery 1.

Furthermore, the embodiment and variations above have been explained in conjunction with the case where the case data stored beforehand in the case data storage unit 12 include the case sensor data (specifically, the sensor data in use before the occurrence of the past failure or before past preventive maintenance is carried out) and where the grace period estimation unit 14 collates the sensor data at the occurrence time of the current anomaly with the case sensor data in order to calculate the occurrence time of the past anomaly. Alternatively, there may be provided diverse variations of the present invention in this respect without departing from the spirit and technical scope of the invention. For example, the case data may include the occurrence times of anomalies in place of the case sensor data. This variation also provides the same advantages as described above.

Moreover, the embodiment and variations above have been explained in conjunction with the case where the case data stored beforehand in the case data storage unit 12 include the maintenance work records and cost records as the maintenance cost information and where the maintenance cost estimation unit calculates the maintenance cost on the basis of the maintenance work records and cost records. Alternatively, there may be provided diverse variations of the present invention in this respect without departing from the spirit and technical scope of the invention. For example, the case data may include previously calculated maintenance costs. This variation also provides the same advantages as described above.

REFERENCE NUMERALS

3 Maintenance management device
11 Error status diagnosis unit
12 Case data storage unit
13 Case data extraction unit
14 Grace period estimation unit
15 Maintenance cost estimation unit
16 Risk map generation unit
17 Screen display unit

The invention claimed is:

1. A maintenance management device for operating machinery, the maintenance management device being located at a distance from the operating machinery and collecting sensor data therefrom, the maintenance management device comprising:
a case data storage unit which stores in advance a plurality of failure case data each including a respective time at which a respective past failure occurred, respective sensor data in use before the respective past failure occurred, a respective type of anomaly presaging the respective past failure, and information on a respective cost of corrective maintenance;
an error status diagnosis unit which diagnoses whether a current anomaly has occurred in the sensor data of the operating machinery;
a case data extraction unit which, when the error status diagnosis unit has diagnosed that the current anomaly has occurred, extracts the plurality of the failure case data which includes the type of the current anomaly;
a grace period estimation unit which, when the error status diagnosis unit has diagnosed that the current anomaly has occurred, estimates a plurality of first grace periods by acquiring, for each of the extracted failure case data, an occurrence time of a respective past anomaly by collating the sensor data in which the current anomaly occurred with the respective sensor data in use before the respective past failure occurred, and calculating a difference between the occurrence time of the respective past anomaly and the respective time at which the respective past failure occurred as the respective first grace period starting from an occurrence time of the current anomaly and leading up to occurrence of a failure of the operating machinery, and estimates a plurality of second grace periods over which preventive maintenance may be postponed without the failure of the operating machinery;
a maintenance cost estimation unit which estimates, for each of the first grace periods, the respective cost of corrective maintenance incurred when the respective first grace period has elapsed based on the information on the respective cost of the corrective maintenance included in the respective extracted failure case data, and estimates, for each of the second grace periods, a respective cost of preventive maintenance incurred when the respective second grace period has elapsed;
a risk map generation unit which generates a risk map having a coordinate system with a first coordinate axis representing grace period time and a second coordinate axis denoting cost, the risk map being divided into a plurality of zones, the risk map having a plurality of combinations of the first grace periods and the costs of corrective maintenance and a plurality of combinations of the second grace periods and the costs of preventive maintenance classified by the zones, and the risk map has one or more timing lines indicating predetermined scheduled maintenance of the operating machinery;
a screen display unit which displays the risk map;
a scheduled maintenance information storage unit storing scheduled maintenance information including intervals of scheduled maintenance predetermined for the operating machinery; and
an operation unit which receives an input to adjust at least one of the timing lines to establish timings of scheduled maintenance, and correspondingly update the intervals of scheduled maintenance stored in the scheduled maintenance information storage unit,
wherein the risk map is displayed by the screen display unit with the timing lines adjusted on the first coordinate axis.

2. The maintenance management device for operating machinery according to claim 1, wherein, upon elapse of time since the time at which the current anomaly occurred until a present time, the grace period estimation unit calculates the first grace period starting from the present time on a basis of the first grace period starting from the occurrence time of the current anomaly.

3. The maintenance management unit for operating machinery according to claim 1, wherein the case data storage unit further stores in advance a plurality of preventive maintenance case data each including a respective time at which a respective preventive maintenance was performed, respective sensor data in use before the respective preventive maintenance is carried out, and the respective type of the anomaly prompting the preventive maintenance, wherein the case data extraction unit which, when the error status diagnosis unit has diagnosed that the current anomaly has occurred, extracts the plurality of preventive maintenance case data which includes the type of the current anomaly, wherein the grace period estimation unit estimates the plurality of second grace periods by acquiring, for each of the extracted preventive maintenance case data, an occurrence time of a respective past anomaly by collating the sensor data in which the current anomaly occurred with the respective sensor data in use before the respective past preventive maintenance is carried out, and calculating a difference between the occurrence time of the respective past anomaly occurred and the respective time at which the respective past preventive maintenance was performed as the respective second grace period starting from the occurrence time of the current anomaly.

4. The maintenance management device for operating machinery according to claim 3, wherein, upon the elapse of the time since the time at which the current anomaly occurred until the present time, the grace period estimation unit calculates the second grace period starting from the present time on a basis of the second grace period starting from the occurrence time of the current anomaly.

5. The maintenance management device for operating machinery according to claim 3,
wherein each of the preventive maintenance case data stored in the case data storage unit includes information on a cost of preventive maintenance,
wherein the maintenance cost estimation unit estimates, for each of the second grace periods, the respective cost of preventive maintenance based on the information on the cost of preventive maintenance included the respective extracted preventive maintenance case data.

6. The maintenance management device for operating machinery according to claim 1, wherein the risk map includes a timing of scheduled maintenance.

* * * * *